United States Patent [19]

Winters

[11] 4,007,330
[45] Feb. 8, 1977

[54] METHOD AND APPARATUS FOR DEMODULATION OF RELATIVE PHASE MODULATED BINARY DATA

[75] Inventor: Michael G. Winters, Canoga Park, Calif.

[73] Assignee: Bunker Ramo Corporation, Oak Brook, Ill.

[22] Filed: Aug. 13, 1975

[21] Appl. No.: 604,085

[52] U.S. Cl. .................................. 178/88; 325/345; 325/65; 325/324; 325/476; 178/67
[51] Int. Cl.² ......................................... H04L 15/24
[58] Field of Search ..................... 178/66 R, 67, 88; 325/344, 345, 349, 45, 47–49, 63, 65, 323, 324, 474–476; 329/112, 126, 142

[56] References Cited
UNITED STATES PATENTS

| | | | |
|---|---|---|---|
| 3,335,224 | 8/1967 | Meslener | 178/88 |
| 3,656,064 | 4/1972 | Giles et al. | 178/66 R X |
| 3,729,684 | 4/1973 | Shuda | 178/66 R X |
| 3,868,579 | 2/1975 | Dilley | 329/126 X |

Primary Examiner—Benedict V. Safourek
Assistant Examiner—Michael A. Masinick
Attorney, Agent, or Firm—F. M. Arbuckle

[57] ABSTRACT

A phase modulated carrier wave, in which a phase reversal represents one of two binary values is demodulated by sampling at a rate $f_s$ greater than the frequency of the carrier, comparing the phase of each sample with a sample delayed a nominal bit period in one channel, a sample delayed less than the nominal bit period in a second channel, and a sample delayed more than the nominal bit period in a third channel to compensate for positive and negative Doppler shift of the carrier from its nominal frequency in the second and third channels, respectively. A code word is detected in each of the three channels by comparing each demodulated sample bit with a replica of the code word, and correlating the results separately for each channel. The channel with the highest correlation is selected as the one most closely tuned to the carrier frequency received.

10 Claims, 4 Drawing Figures

METHOD AND APPARATUS FOR DEMODULATION OF RELATIVE PHASE MODULATED BINARY DATA

BACKGROUND OF THE INVENTION

This invention relates to a method and apparatus for detection and demodulation of binary phase modulated signals, and particularly to detection and demodulation of relative phase modulated binary data on a carrier.

Phase modulation of binary data on a carrier wave (electromagnetic or acoustic) is commonly used since the phase-shift of the carrier wave from one bit period to another is relatively easy to demodulate. In some systems the carrier is actually a subcarrier modulated on a steady-phase carrier. In either case, the modulated signal is tracked by the receiver in a phase-lock loop used to generate a reference signal for demodulation purposes (i.e., for phase detection). However, that and other techniques for extracting a phase reference from the signal received is normally exploited only in electromagnetic transmissions due to limitations of transducers employed in acoustic wave transmissions.

In systems which do not somehow transmit a phase reference, relative phase modulation is employed to encode the binary data on the carrier. For example, each bit period may consist of a precise number of carrier cycles, such as seven, with a phase reversal of one bit period to indicate a binary 0. Transmission of either phase (0° or 180°) may be selected for an initial bit period. If a 0 is the first data bit, the phase of the carrier is switched (inverted) at the end of that initial bit period if the next data bit is a binary 1, otherwise successive bit periods of switched phase represent a data bit 0. The convention could, of course, be opposite such that reversing the phase of successive bit periods represents binary 1 data bits, and not reversing the phase represents binary 0 data bits.

To demodulate relative phase modulated signals, the carrier received during each bit period is stored and compared with the phase of the carrier during the next period. Each period thus provides a reference phase for the next period.

A problem with relative phase modulation is demodulation in the presence of Doppler shift due to relative motion between the transmitter and receiver, particularly when the Doppler shift is not known in advance and cannot be independently determined.

To understand this problem which arises because of Doppler shift, assume a binary bit period of the modulated carrier to consist of seven cycles of the carrier. With a positive Doppler shift, the period of the seven cycles decreases while for a negative Doppler shift the period increases. Consequently, if an attempt is made to demodulate by comparing the phase of one bit period with the phase of a succeeding bit period, an error will occur because one bit period being compared with the other will be overlapping with another bit period, and this error would be cumulative such that after demodulating a 10 to 20 bit word, the demodulation of the last few bits would be totally unreliable. The error is, of course, the offset in the comparison of cycles in one data bit period with cycles of a succeeding data bit period. But even assuming that somehow demodulation has been properly effected in the presence of significant Doppler phase shift, there is still a problem in proper identification of the bits in the resulting (demodulated) signal.

To appreciate this last problem of identifying a properly demodulated signal in the presence of Doppler shift, consider trying to decode the first N bits of coded transmission by comparison with an N bit coded word stored at the receiver. It is common practice to transmit such a coded word for such comparison in order to determine when the first bit of a following message occurs, or to simply discriminate against noise where only the coded word is transmitted, as when a coded word is used to cause a receiver to respond in some way. An example might be to shut off a valve in a blowout prevention system for offshore drilling platforms. Serial or parallel comparison of the coded signal received with a stored replica would be impossible, unless the replica is somehow compressed or expanded by an amount approximately equal to the amount the data bit periods of the coded signal have been compressed or expanded due to any Doppler shift caused by relative motion between the transmitter and the receiver.

OBJECTS AND SUMMARY OF THE INVENTION

An object of this invention is to provide for improved demodulation of relative binary phase-shift modulated signals.

Another object is to provide for improved detection of demodulated binary phase-shift modulated signals.

These and other objects of the invention are achieved in its broadest aspects by demodulating relative phase-shift modulated binary digits (bits) in at least three parallel channels, in a first channel by comparing the phase of the carrier received with the phase of the carrier delayed one nominal bit period, in a second channel by comparing the phase of the carrier received with the phase of the carrier delayed less than one nominal bit period to provide compensation for positive Doppler shift of the carrier, and in a third channel by comparing the phase of the carrier received with the phase of the carrier delayed more than one nominal bit period to provide compensation for negative Doppler shift of the carrier. The demodulated outputs of the separate channels are processed through separate delay circuits, the first demodulating channel output through a delay circuit for storing N·S samples of demodulated bits of an N-bit word, where the bit periods are assumed to be neither contracted or expanded by Doppler shift of the carrier, the second demodulating channel output through a delay circuit for storing N(S−ΔS) demodulated bits of the N-bit word where the bit periods are assumed to be contracted by a predetermined Doppler shift, and the third demodulating channel output through a delay circuit for storing N(S+ΔS) demodulating bits of the N-bit word where the bit periods are assumed to be expanded by a predetermined Doppler shift. A replica of the N-bit being demodulated is compared with N, N(S−ΔS) and N(S+ΔS) demodulated samples of the carrier in the three delay circuits through separate comparators as the demodulated samples pass through the delay circuits, and each demodulated sample compared that matches a replica bit produces a bit 1 in whatever position the comparison is made. All the N bits produced in each channel during each sample period are separately summed and the sums over the last S, S−ΔS and S+ΔS samples are accumulated such that each accumulated sum will reach a peak value as the demodulated samples pass through the delay circuit. The accumulated sums thus produced are monitored to determine which channel produces the largest peak value. The channel producing the largest peak may then be selected as the one which has the highest probability of containing a correct output since it is more closely "tuned" to the Doppler shift of the carrier, but only if the largest peak value is determined to be greater than a predetermined acceptable value.

The novel features that are considered characteristic of this invention are set forth with particularity in the appended claims. The invention will best be understood from the following description when read in connection with the accompanying drawings.

DESCRIPTION OF PREFERRED EMBODIMENTS

In the following description of the present invention, reference will be made to an underwater acoustic transducer (hydrophone) connected to a system for detecting a binary coded identification (ID) word phase-modulated on a carrier. That is useful in tracking or locating the position of an object in the water transmitting the carrier. However, it should be noted that the coded word could be a command to be executed, as in acoustic command system used in blowout prevention mechanisms for offshore drilling platforms. However, the principles of the invention are not limited to either a tracking system or an acoustic command system. In fact, the principles will apply to any relative phase-shift modulated signal for binary digits to be demodulated and detected, such as where a message is preceded by an ID word. Once the ID word is identified, the demodulated message that follows can be entered into a digital system for storage or further processing. It should also be noted that the carrier need not in all cases be an acoustic wave since the principles of this invention will apply equally to an electromagnetic wave carrier for relative phase-shift modulated binary digits.

Figure 1:
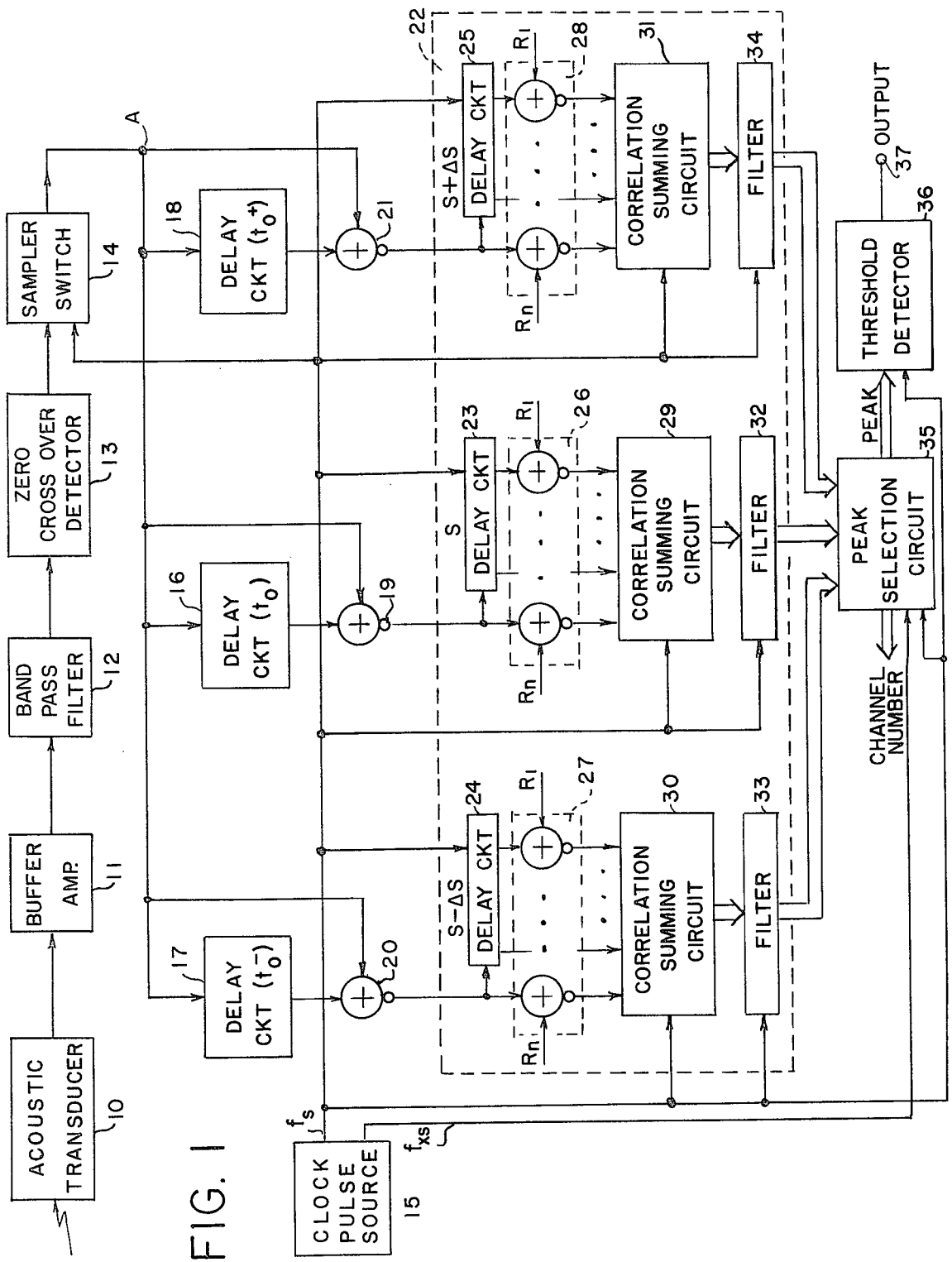
FIG. 1 is a block diagram of the invention.

Referring now to FIG. 1, an acoustic transducer 10 is coupled by a buffer amplifier 11 to a band-pass filter 12 set to pass a modulated carrier signal at a frequency $f_o$ from a transmitter under such conditions that there is a possibility of relative motion between the transmitter and receiver giving rise to a Doppler shift of the carrier received through the acoustic transducer. The carrier frequency $f_o$ is typically 13 KHz. That is the nominal frequency of the carrier received. Any Doppler effect present may shift the carrier to a slightly higher or lower frequency.

Figure 2:
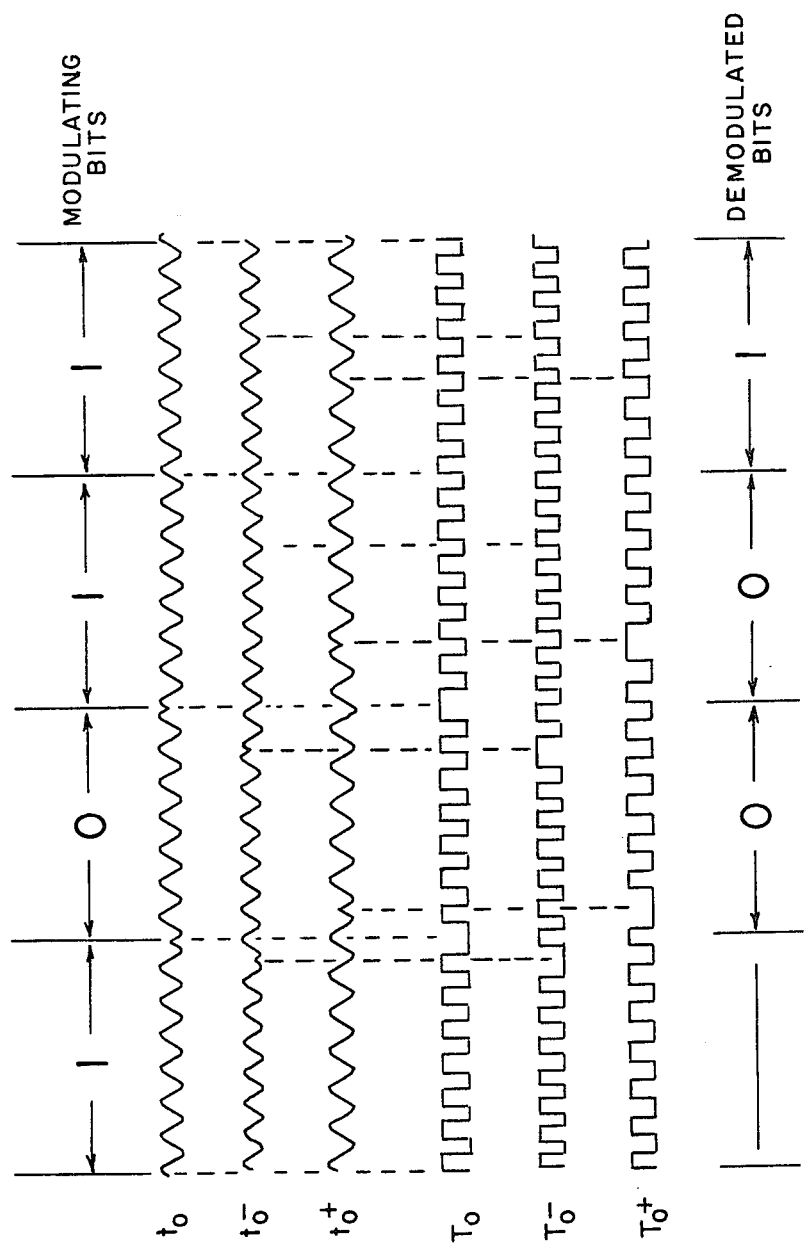
FIG. 2 illustrates relative phase-shift modulation of binary signals with positive and negative Doppler shift.

FIG. 2 illustrates a carrier waveform $t_o$ which has been subjected to relative phase-shift modulation. The nominal data bit time selected is seven cycles of the carrier signal. If received without Doppler shift, the modulated carrier can be demodulated by comparing the phase of seven cycles in one data bit period with the phase of seven cycles in the immediately succeeding data bit period. If the phase of the succeeding data bit period has been reversed, the demodulated data bit is a binary 0. For example, the phase of the carrier signal which preceded the first data bit 1 shown on the left was the same, it is concluded that the first data bit shown in the waveform $t_o$ is a binary 1 upon comparing its phase with the phase of the preceding bit period. Since the phase of the carrier in the following bit period (the second shown) is reversed, as determined by comparing the phase of the carrier in that second bit period with the phase of the first bit period shown, it is concluded that the second data bit modulated on the carrier is a binary 0. In this illustrated waveform $t_o$, the phase of the carrier in the third bit period is the same as the phase of the first bit period for another binary 1. In the fourth bit period, the phase of the carrier is the same as the phase of the carrier during the preceding bit period. The fourth bit modulated on the carrier is thus also a binary 1. Therefore, upon demodulating the third bit is determined to be a bit 0 and the fourth bit is determined to be a bit 1. If the four bit periods shown constitute the entire transmission of a binary coded word, the modulated bits 1011 are demodulated as 001. The additional (initial) bit is lost in the demodulating process.

A waveform $t_o+$ shown in FIG. 2 represents the same modulated carrier as the waveform $t_o$, but with a negative Doppler shift resulting in expanded data bit periods, each still with seven cycles. Similarly, a waveform $t_o-$ shown in FIG. 2 represents the modulated carrier with a positive Doppler shift resulting in contracted data bit periods, each still with seven cycles. Since the modulated carrier is to be always demodulated by comparing the phase of the carrier in one data bit period with the phase of the carrier in the preceding data bit period, it is very difficult, if not impossible, to demodulate unless any Doppler effect present can be detected or can be determined in advance in order to ascertain which period in time is to be compared with a preceding bit period.

If some compensation is not introduced, the error in demodulating a Doppler shifted carrier is cumulative from data bit to data bit. For instance, assuming the first data bit shown in FIG. 2 has been somehow properly demodulated in a Doppler shifted carrier by comparing the phase of the carrier during that period with the phase of the carrier during the preceding nominal data bit period, it can be seen from the waveforms $t_o+$ and $t_o-$ of FIG. 2 that, in a Doppler shifted carrier, the nominal data periods which follow the first data bit period will overlap the preceding or following data bit period. Consequently, if a nominal data bit period is employed for demodulation, the result is correct for only part of the data bit period. The present invention compensates for this expansion or contraction of the data bit periods in the presence of a negative or positive Doppler shift.

The signal from the band-pass filter 12 is processed through a zero cross-over detector 13, which may be comprised of a high-gain saturating amplifier. An example of such a comparator is a diode limited operational amplifier where the slope of the amplifier characteristic in the limit region is very nearly zero due to the low resistance of a limiting diode. The zero cross-over detector 13 produces a square-wave signal in phase with the received signal as shown by the square-wave signals $T_o$, $T_o+$ and $T_o-$ for the carrier waveforms $t_o$, $t_o+$ and $t_o-$ as shown in FIG. 2. The high and low levels of the square wave are conveniently selected to be digital logic levels representing binary 1 and binary 0 digits, respectively, for the digital logic circuits that follow.

The square-wave signal is then sampled by the operation of an electronic sampler switch 14 which may be simply a D-type flip-flop triggered by clock pulses from a source 15 at a rate $f_s$ selected to produce a significantly large number of samples of each square-wave cycle. For example, if the nominal data bit time is seven cycles of the carrier as shown in FIG. 2, and the sampling rate $f_s$ is selected to be 250 samples per nominal data bit period, the number of samples of each nominal square wave cycle will be very nearly 36, and the number of samples of each square-wave cycle in a Doppler shifted signal will be $36 \pm d$, where $d$ is a small number selected to account for the expansion or contraction of the carrier cycles and therefore of data bit periods due to some average Doppler shift expected.

The signal present at the output of the switch 14 is a train of binary digit samples at logic 1 and 0 levels at a rate of S pulses per nominal bit period. This permits the use of synchronous digital circuits for data detection following demodulation, as will be described more fully hereinafter, but since the data detection techniques that follow the demodulation could conceivably be implemented with analog circuits almost as well as with digital circuits, the switch 14 and clock pulse source 15 could be omitted. In either case, the signal at point A contains the relative phase shift modulation of the data bits.

Three delay circuits 16, 17 and 18 couple the train of sample pulses to three comparators 19, 20 and 21, respectively, for demodulation by comparison with the sample pulses coupled directly from the point A at the input of the delay circuits. The circuit 16 is selected to delay the train of pulses one nominal data bit period so that, with respect to a carrier signal which has not been subject to Doppler shift, the output of the comparator 19 is demodulated data without any error. If the carrier signal has been subject to a Doppler shift, there may be some error as described hereinbefore with reference to FIG. 2. To compensate for any Doppler shift, the delay circuits 17 and 18 are selected to delay the sample pulses by a time equal to a nominal bit period minus and plus a predetermined amount where the amount is that shown in waveform timing diagram of FIG. 2. In that manner, three demodulation processes take place in parallel in the comparators 19, 20 and 21, one demodulation in the comparator 19 without any compensation for Doppler shift, one with a smaller delay in the comparator 20 to compensate for positive Doppler shift, and one with a larger delay in the comparator 21 to compensate for negative Doppler shift.

Each comparator is comprised of an inverting exclusive-OR circuit which produces a logic 1 output if a delayed sample pulse is of the same logic 1 or 0 level as a sample pulse of the undelayed sample pulse train; otherwise, it produces a logic 0 output indicating that the sample pulses compared are not of the same phase. If there has been no Doppler shift in the carrier signal, the output of the comparator will, under ideal conditions, produce a logic 1 or 0 output throughout each of the undelayed 250 sample pulses, a logic 1 if the phase of the modulated carrier during one data bit period is the same as the phase of the modulated carrier during one succeeding data bit period, and a logic 0 if the phase of the modulated carrier differs between the two data bit periods thus being compared. This results in demodulation of the relative phase shift modulated data bits.

It should be noted that in demodulating relative phase-shift modulated data, the absolute phase of the carrier for a bit 1 may be $\sin(\omega t + 0°)$ or $\sin(\omega t + 180°)$, depending only upon the convention assumed. It thus follows that at least one bit initial period of the carrier must be devoted to establishing a reference. In practice this initial bit period may extend beyond the seven cycles of the nominal bit period. Following that, data bits are phase-shift modulated on the carrier by reversing the phase of the carrier for each data bit 0, and not reversing the phase of the carrier for each data bit 1 as illustrated in FIG. 2.

Following demodulation, the data samples are processed through a detector-correlator 22 to determine which of the comparators 16, 17 and 18 had most accurately demodulated the relative phase-shift modulated carrier with respect to an N-bit replica of the data transmitted, where the data is a binary coded word which, for example, may identify the transmitter, or which may command the receiver to being receiving and processing data from a selected one of the comparators 19, 20 and 21, or a selected one of three delay circuits 23, 24 and 25 in the detector-correlator. The delay circuits 23, 24 and 25 are adapted to respectively hold S, S−ΔS, and S+ΔS samples of every binary digit in a data word to be detected. Thus, the delay circuit 23 is adapted to store N·S samples while the delay circuits 24 and 25 are adapted to store N(S−ΔS) and N(S+ΔS) samples, respectively, where ΔS is the number of fewer or greater samples of a Doppler shifted carrier in a contracted or expanded data bit period relative to the nominal data bit period of S samples.

A number, N, of the demodulated sample bits in the delay circuits 23, 24 and 25 spaced S, S−ΔS and S+ΔS samples apart are continuously compared with an N-bit replica of the transmitted signal code in comparators 26, 27 and 28. Each comparator is comprised of N inverting exclusive-OR circuits having one input terminal connected to one of N output terminals of the delay circuits and the other input terminal connected to a replica input corresponding to the relative position of the input terminal connected to the delay circuit with the $n$th replica bit $R_n$ of the code word on the left.

Figure 3:
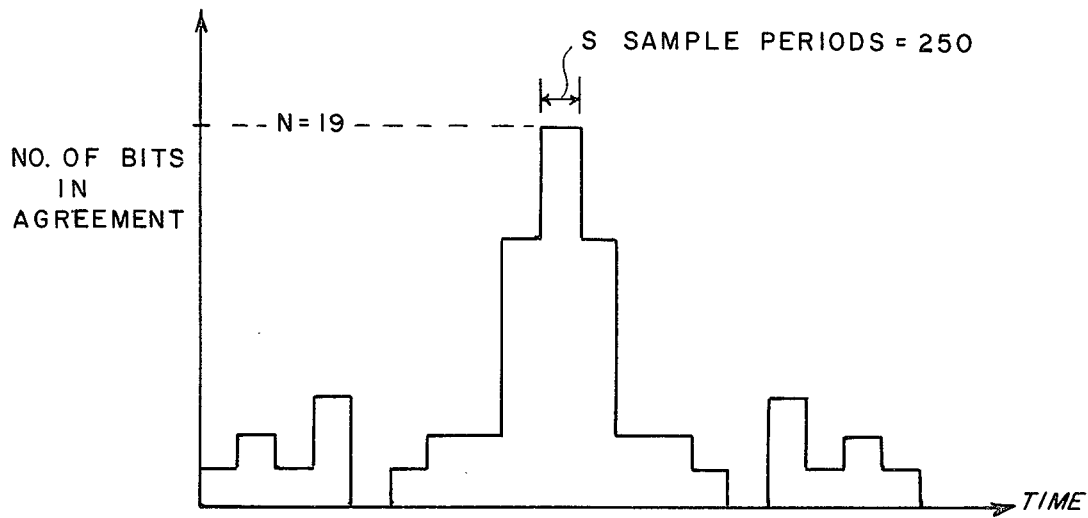
FIGS. 3 and 4 illustrate typical comparator and correlation sum outputs, respectively, of one of three channels.
Figure 4:
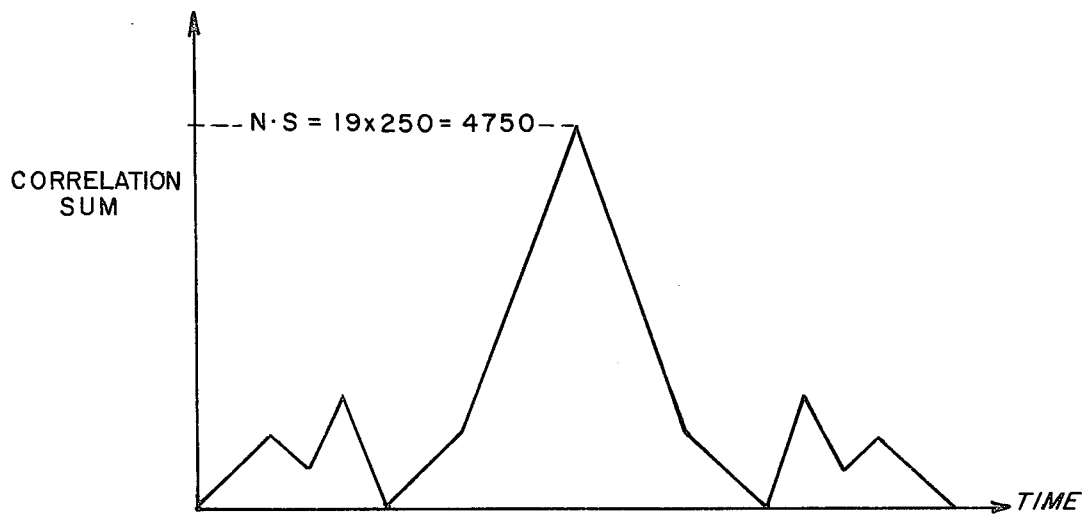

As the demodulated samples move through the delay circuits 23, 24 and 25, comparisons are made of each sample with the replica bits such that each sample is compared with each of N replica bits. When a sample agrees with the replica bit, the output of the inverting exclusive-OR circuit making the comparison is a logic 1; when the sample bit does not agree, the output of the exclusive OR circuit making the comparison is a logic 0. The separate outputs of the N inverting exclusive-OR circuits in each of the comparators 26, 27, 28 are separately summed in correlation summing circuits 29, 30 and 31 over the last S, S−ΔS and S+ΔS sample periods, respectively. When all N samples compared at one time agree with replica binary signals, which can occur in only one of three comparators, the output of that one comparator will have a maximum output. FIG. 3 illustrates a typical output of that one comparator where the ordinate represents the number of N bits in agreement. For example, in the correlation circuit 29, the peak represents the number of N·S sample bits in agreement. As the demodulated signal passes through the delay circuit, the number of bits in agreement builds up to a maximum and then decreases again. As can be seen, the maximum sum has an effective "width" of S, S−ΔS and S+ΔS for the respective comparators 26, 27 and 28. The correlation summing circuits 29, 30 and 31 accumulate the comparator output sums over the last S, S−ΔS and S+ΔS sample periods, respectively, to reach a peak at the trailing edge of the peak in the graph of FIG. 3. For example, if the graph of FIG. 3 is for the nominal channel, it will reach a peak sum of N·S at that time as shown in FIG. 4.

The other correlation circuits will reach a peak in a similar manner but at a different time, and their peaks will be lower if there has been no Doppler shift. If there has been a positive Doppler shift (increase in frequency of the carrier), the correlation circuit 30 will reach a peak when all S−ΔS samples of each of the N contracted data bits are compared with the proper replica bits, and that peak will be higher than from the other correlation circuits. Similarly, if there has been a negative Doppler shift (decrease in frequency of the carrier), the correlation circuit 31 will reach a peak when all S+ΔS samples of each of the N expanded data bits are compared with the proper replica bits and that peak will be higher than from the other correlation circuits. The outputs of the correlation circuits 29, 30 and 31 are passed through respective filters 32, 33 and 34 which remove extraneous clock noise and unwanted switching transients.

All outputs of the filters 32, 33 and 34 are connected to a peak selection circuit 35 which selects the largest sum from the three correlation circuits 29, 30 and 31. The correlation circuit with the largest sum is the one which has the higher probability of containing a correct signal since it is more closely "tuned" to the carrier signal which may have been subject to a Doppler shift. If no Doppler shift has occurred, the correlation circuit 29 will have the largest sum as just noted, while if a positive Doppler shift has occurred, the correlation circuit 30 will have the largest, and if a negative Doppler shift has occurred, the correlation circuit 31 will have the largest sum. In each case, the selected peak is fed from the correlation circuit 35 to a threshold detection circuit 36 which allows an output to occur at a terminal 37 only when the largest sum selected exceeds a predetermined level.

It should be recognized that all of the system described may be implemented with analog circuits with the judicious use of amplifiers and limiters, but some or all may be implemented with digital circuits, particularly the delay circuits and the correlation circuits. The delay circuits may be implemented as digital shift registers synchronized by the clock pulse source 15, as shown, while the correlation circuits are implemented with a combination of adders all as described in a copending application, Ser. No. 604,121, filed concurrently herewith by Robert C. Flanagan. The sums are then in digital form, clocked into output buffer registers in the following filters 32, 33 and 34, but each sum produced by each correlation circuit at any given time may be converted from digital-to-analog form using a conventional digital-to-analog converter connected to the buffer register. The filters would thus become essentially digital-to-analog converters. However, even if digital techniques are employed, it would be preferable to retain some filtering function by implementing the output buffer as an accumulator for all the sums formed over the last data bit period to form a running sum over the last N·S, N(S−ΔS) and N(S+ΔS) samples in the respective filters 32, 33 and 34, as described in the aforesaid copending application. The output of the filter (running sum accumulator) would then be as shown by the dotted line graph of FIG. 3 where each point in the ordinate is multiplied by a factor S, S−ΔS or S+ΔS.

If digital techniques are employed in the correlation-detector 22, digital circuits should be used in the demodulating delay circuits as well, such as with shift registers synchronized with the sample switch by pulses from the clock pulse source 15 as shown. For example, the delay circuit 17 may be implemented as a shift register having S−ΔS stages. Its output would then be fed to the delay circuit 16 having ΔS stages, and its output would be fed to the delay circuit 18 having ΔS stages to progressively delay each sample through S−ΔS, S and S+ΔS sample periods. To implement the selection circuit with digital techniques, a multiplexer at the input of the selection circuit continually gates the filters 32, 33 and 34 to binary comparators in sequence at a rate $f_{xs}$ higher than the sampling rate $f_s$ by a factor $x$ (typically 4). The multiplex gated input to the selection circuit compares its value to that stored in a register. If it is greater, it is stored in that register as the multiplexer advances to the next channel. At the same time the number of the channel is stored at one end of the register from the multiplexer, a 2-stage binary counter. Every fourth step of the multiplexer, the content of the register in the selection circuit is gated into the threshold detector for comparison with a predetermined minimum acceptable peak value. If greater, the multiplexer is stopped, leaving the largest peak and its channel address in the register. The address may be used to gate demodulated data bits from either the input or the output of the delay circuit in that channel, preferably the output in order to also read out the ID code just detected.

Although particular embodiments of the invention have been described herein, it is recognized that modifications and variations may readily occur to those skilled in the art, particularly in the implementation of various ones of the functional blocks in the detector-correlator 22. Also, it should be recognized that the convention of representing a binary 0 with a phase reversal, and a binary 1 with no phase reversal is arbitrary. The convention could just as well have been to represent a binary 1 with a phase reversal, and a binary 0 with no phase reversal.

The embodiments of the invention in which an exclusive property or privilege is claimed are described as follows:

1. In a communication system employing a carrier on which binary signals have been modulated by reversing the phase of the carrier 180° for representation of one binary value and not reversing phase for representation of the other binary value, a method of demodulating binary digits modulated on said carrier comprising
    conditioning the modulated carrier signal received in preparation for demodulation by phase comparison of each data bit period of said carrier with its succeeding data bit period,
    delaying the conditioned carrier signal for a plurality of distinct periods with at least one delay period less than the nominal period of a data bit modulated on said carrier, one delay period equal to said nominal data bit period, and one delay period greater than said nominal data bit period,
    phase comparing the conditioned carrier signal as delayed by said distinct periods in separate channels with the conditioned carrier signal undelayed, thereby demodulating said conditioned carrier signal with compensation for positive Doppler shift, no Doppler shift and negative Doppler shift, and
    selecting the channel producing a signal having the most detectable binary signals in a first group of a number, N, of successive data bit periods.

2. A method as defined by claim 1 wherein said first group of successive data bit periods is comprised of an N-bit code and the selecting process is comprised of the steps of continually code comparing the output of each demodulation channel with a static replica of said N-bit code, each demodulated bit being compared in sequence with every replica bit to produce a comparison bit 1 each time a demodulated bit compares with a replica bit, summing separately for each demodulation channel all comparison bits produced by the comparison of demodulated bits with replica bits at any one time to produce a value the magnitude of which represents the degree of correlation between demodulated bits and said replica bits, and determining which channel reaches the highest correlation.

3. A method as defined in claim 2 wherein the step of conditioning the modulated carrier signal includes converting the modulated carrier signal to a square wave of the same frequency and phase as said carrier signal, periodically sampling said square wave at a constant rate to produce a number, S, of samples during each nominal data period, wherein the step of phase comparing the conditioned carrier signal in the separate demodulation channels is comprised of comparing $S-\Delta S$, $S$ and $S+\Delta S$ samples of the delayed conditioned carrier signal with a corresponding number of undelayed samples, where $-\Delta S$ is a number selected for compensation of positive Doppler shift and $+\Delta S$ is a number selected for compensation of negative Doppler shift such that the respective delays in the delaying process are for periods of $S-\Delta S$, $S$ and $S+\Delta S$ sample periods, the step of code comparing is carried out for every sample of every demodulation channel, and where correlation values of the respective demodulation channels are summed over the last $N(S-\Delta S)$, $N \cdot S$ and $N(S+\Delta S)$ samples demodulated and compared with the replica bits.

4. In a communication system employing a carrier on which binary signals have been modulated by reversing the phase of the carrier 180° for representation of one binary value and not reversing phase for representation of the other binary value, a method of demodulating binary digits modulated on said carrier comprising converting the modulated carrier signal to a square wave of the same frequency and phase as said carrier signal, sampling said square wave at a constant rate to produce a number, S, of samples during each data bit period, delaying said samples for a data bit period, comparing the phase of said delayed samples with undelayed samples, thereby demodulating said square-wave signal samples to produce demodulated data bit samples continually code comparing said demodulated data bit samples with a static replica of an N-bit code modulated on said carrier, each demodulated data bit sample being compared in sequence with each replica bit to produce a bit 1 each time a demodulated data bit sample compares with a replica code bit, summing separately all comparison bits produced during each sample period to produce a value the magnitude of which represents the degree of correlation between demodulated bits and said replica bits, and accumulating said values to produce a correlation sum over the last $N \cdot S$ samples.

5. The method of claim 4 including the step of comparing said correlation sum during each sample period to determine if it exceeds a predetermined threshold value.

6. In a communication system employing a carrier on which binary signals have been modulated by reversing the phase of the carrier 180° for representation of one binary value and not reversing phase for representation of the other binary value, apparatus for demodulating binary digits modulated on said carrier comprising means for conditioning the modulated carrier signal received in preparation for demodulation by phase comparison of each data bit period of said carrier with its succeeding data bit period, a plurality of delay means for delaying the conditioned carrier signal output of said conditioning means for a plurality of distinct periods, one delay means for a period less than the nominal period of a data bit modulated on said carrier, one delay means for a period equal to said nominal data bit period, and one delay means for a period greater than said nominal data bit period, plurality of phase comparing means for comparing the output of each delay means with said conditioned carrier undelayed, thereby demodulating said conditioned carrier signal with compensation for positive Doppler shift, no Doppler shift and negative Doppler shift in respective comparing means, and means connected to each of said plurality of phase comparing means for selecting the phase comparing means producing a signal having the most detectable binary signals in a first group of a number, N, of successive data bit periods.

7. Apparatus as defined in claim 6 wherein said first group of successive data bit periods is comprised of an N-bit code, and said selecting means is comprised of a plurality of code comparing means, a separate one for continually comparing the output of a different one of said phase comparing means with a static replica of said N-bit code, each demodulated bit being compared in sequence with every replica bit to produce a comparison bit 1 each time a demodulated bit compares with a replica bit, a plurality of summing means, a separate one for summing the comparison bits from a different one of said code comparing means produced by the comparison of demodulated bits with replica bits at any one time to produce a value the magnitude of which represents the degree of correlation between demodulated bits and said replica bits, and means for determining which summing means reaches the highest correlation.

8. Apparatus as defined in claim 7 wherein said signal conditioning means includes means for converting the modulated carrier signal to a square wave of the same frequency and phase as said carrier signal and means for periodically sampling said square wave at a constant rate to produce a number, S, of samples during each nominal data period, whereby phase comparisons by said phase comparing means is comprised of comparing $S-\Delta S$, $S$ and $S+\Delta S$ samples of the delayed samples with a corresponding number of undelayed samples, where $-\Delta S$ is a number selected for compensation of positive Doppler shift and $+\Delta S$ is a number selected for compensation of negative Doppler shift such that the respective delays in said plurality of delay means are for periods of $S-\Delta S$, S and $S+\Delta S$ sample periods, and wherein each of said code comparing means operates on every sample, and including a plurality of accumulating means for accumulating separately said correlation values of said separate summing means over the last $N(S-\Delta S)$, $N \cdot S$ and $N(S+\Delta S)$ sample periods.

9. In a communication system employing a carrier on which binary signals have been modulated by reversing the phase of the carrier 180° for representation of one binary value and not reversing phase for representation of the other binary value, apparatus for demodulating binary digits modulated on said carrier comprising means for converting the modulated carrier signal to a square wave of the same frequency and phase as said carrier signal, means for sampling said square wave at a constant rate to produce a number, S, of samples during each data bit period, means for delaying said samples for a data bit period, means for comparing the phase of said delayed samples with undelayed samples, thereby demodulating said square-wave signal samples to produce demodulated data bit samples, means for continually code comparing said demodulated data bit samples with a static replica of an N-bit code modulated on said carrier, each modulated data bit sample being compared in sequence with each replica bit to produce a bit 1 each time a demodulated data bit sample compares with a replica code bit, means for summing separately all comparison bits produced during each sample period to produce a value the magnitude of which represents the degree of correlation between demodulated bits and said replica bits, and means for accumulating said values to produce a correlation sum over the last $N \cdot S$ samples.

10. Apparatus as defined in claim 9 including means for comparing said correlation sum druing each sample period to determine if it exceeds a predetermined threshold value.

* * * * *